(12) United States Patent
Cornog

(10) Patent No.: US 11,745,780 B2
(45) Date of Patent: Sep. 5, 2023

(54) SECURABLE COVER PANEL FOR SHOPPING CART

(71) Applicant: Raymond Cornog, Hampton, GA (US)

(72) Inventor: Raymond Cornog, Hampton, GA (US)

( * ) Notice: Subject to any disclaimer, the term of this patent is extended or adjusted under 35 U.S.C. 154(b) by 614 days.

(21) Appl. No.: 16/809,175

(22) Filed: Mar. 4, 2020

(65) Prior Publication Data

US 2020/0283048 A1    Sep. 10, 2020

Related U.S. Application Data

(60) Provisional application No. 62/815,047, filed on Mar. 7, 2019.

(51) Int. Cl.
*B62B 5/00* (2006.01)
*B62B 3/14* (2006.01)
*B62B 3/02* (2006.01)

(52) U.S. Cl.
CPC .............. *B62B 5/00* (2013.01); *B62B 3/022* (2013.01); *B62B 3/14* (2013.01); *B62B 3/146* (2013.01); *B62B 3/1468* (2013.01); *B62B 2202/023* (2013.01)

(58) Field of Classification Search
CPC ... B62B 3/1428; B62B 3/1472; B62B 3/1468; B62B 3/146; B62B 2202/023
See application file for complete search history.

(56) References Cited

U.S. PATENT DOCUMENTS

| 3,993,319 | A | * | 11/1976 | Day | B62B 3/1428 108/14 |
| 4,583,753 | A | * | 4/1986 | Economy | B62B 3/1428 224/562 |
| 4,679,818 | A | * | 7/1987 | Kakavas | B62B 3/142 108/90 |
| 4,901,901 | A | * | 2/1990 | Reitenour | B62B 3/1428 190/11 |
| 5,002,215 | A | * | 3/1991 | Gregoire | B62B 3/1428 D34/27 |
| 5,004,252 | A | * | 4/1991 | Kraper | B62B 3/1428 280/DIG. 4 |
| 5,348,323 | A | * | 9/1994 | Trubiano | B62B 3/144 280/33.993 |
| 5,425,546 | A | * | 6/1995 | Gerber | B62B 3/1456 248/459 |
| D368,566 | S | * | 4/1996 | Glaeser | D34/27 |
| 6,832,768 | B2 | * | 12/2004 | Duchene | B62B 3/1472 280/33.993 |
| 6,944,981 | B1 | * | 9/2005 | Garberg | B62B 3/1472 40/606.03 |
| D583,123 | S | * | 12/2008 | Cassin, III | D34/27 |

(Continued)

FOREIGN PATENT DOCUMENTS

CA    2205141 A1 * 11/1998
WO    WO-2015113117 A1 * 8/2015 ........... B62B 3/1436

*Primary Examiner* — Emma K Frick
(74) *Attorney, Agent, or Firm* — BALLARD SPAHR LLP

(57) ABSTRACT

A lockable cover panel for a shopping cart and a shopping cart comprising the same is disclosed. The shopping cart can comprise a frame, a plurality of wheels, and a main compartment. The shopping cart can further comprise a collapsible secondary compartment comprising a first panel and a lower panel and defining a top opening. A cover panel can pivotably attach to the first panel and extend across the top opening.

20 Claims, 9 Drawing Sheets

(56) References Cited

U.S. PATENT DOCUMENTS

| | | | | |
|---|---|---|---|---|
| 7,837,205 | B2* | 11/2010 | Simard | B62B 3/144 |
| | | | | 280/33.996 |
| 10,220,867 | B1* | 3/2019 | McGee | B62B 3/005 |
| 2009/0140505 | A1* | 6/2009 | Fryer | B62B 3/146 |
| | | | | 280/33.994 |
| 2014/0035244 | A1* | 2/2014 | Bello | B62B 3/146 |
| | | | | 280/33.994 |

* cited by examiner

SECURABLE COVER PANEL FOR SHOPPING CART

CROSS-REFERENCE TO RELATED APPLICATION

This application claims priority to and the benefit of U.S. Provisional Patent Application No. 62/815,047, filed Mar. 7, 2019, the entirety of which is hereby incorporated by reference herein in its entirety.

FIELD

This application relates generally to systems and devices for providing a securable compartment on a shopping cart.

BACKGROUND

Conventionally, shopping carts have a main compartment for carrying groceries. Many shopping carts further have a small collapsible secondary compartment proximate the cart's handle. Shopping carts often are receivable into other shopping carts in order to reduce spaced consumed by a plurality of shopping carts. The collapsible secondary compartment typically folds when the shopping cart is received into another shopping cart. The secondary compartment can automatically deploy when the shopping cart is disengaged and separated from the other shopping cart.

Shoppers can carry valuables, often in bags and purses, when they shop. Accordingly, it would be desirable to provide a place to safely store the valuables so that the shoppers do not have to carry their respective valuables on their persons.

SUMMARY

Disclosed herein, in one aspect, is a shopping cart comprising a securable cover panel.

A shopping cart can comprise a frame and a plurality of wheels coupled to a bottom of the frame. A main compartment can be coupled to the frame. The main compartment can define a front face, a back face opposing the front face, first and second side faces extending between respective side edges of the front face and the back face, and a bottom face extending between lower edges of the first and second side faces between the front face and the back face. A secondary compartment can be movable between a collapsed configuration and a deployed configuration. The secondary compartment can be disposed at least partially within the main compartment. The secondary compartment can comprise a first panel that is pivotable about a first axis to a position that is proximate to the back face when the secondary compartment is in the collapsed configuration. A lower panel can be is pivotably coupled at a first end and slidably coupled at a second end so that the lower panel is movable between a collapsed position and a deployed position. The first panel, the back face, the lower panel, and portions of the side faces can cooperate to define the secondary compartment having a top opening. A cover panel can be pivotable about a second axis from a first orientation that is generally parallel to and adjacent to the first face to a second orientation that covers the top opening.

The cover panel can comprise a loop configured to receive a lock hasp.

The cover panel can comprises a magnet that is configured to engage the first face in order to hold the cover panel in the first orientation.

The lower panel can be pivotably coupled at a first end to the first panel and slidably coupled at a second end at the back face so that the lower panel is movable between a collapsed position and a deployed position.

The cover panel can be generally planar.

The cover panel can comprise a mesh.

The mesh can be a wire mesh.

The cover panel can comprise at least one material selected from the group of molded polymer and sheet metal.

The shopping cart can further comprise a latch that is pivotally coupled to one of the main compartment of the shopping cart and the cover panel. A retainer can be coupled to the other of the main compartment of the shopping cart and the cover panel. When the cover panel is in the second orientation, the latch can be configured to be pivoted from a first position that is engagement with the retainer and a second position that is not in engagement with the retainer. When the latch is in engagement with the retainer, the latch can inhibit movement of the cover panel from the second orientation.

The top opening can have a length and a width. The cover panel can extend at least 90% of the width of the top opening in a transverse dimension. The cover panel can extend at least 90% of the length of the top opening in a second dimension that is perpendicular to the transverse dimension.

The cover panel can extend at least the length of the top opening in the second dimension.

When the cover panel is in the second orientation, the second compartment and the cover can cooperate to define an enclosed volume with a largest opening having an area that is less than twenty-five square inches.

A cover panel can be provided for a shopping cart comprising a main compartment and a collapsible secondary compartment defining a top opening having a length and a width and comprising a first panel that is pivotable from a stowed position that is generally parallel to a back face of the main compartment and a deployed position that is pivoted from the stowed position, wherein the first panel comprises a top edge. The cover panel can comprise a generally planar cover panel that configured to pivotably couple with the first panel at a top edge of the first panel. The generally planar cover panel can extend at least a majority of the width of the secondary compartment in a transverse dimension. The generally planar cover can extend at least a majority of the length of the secondary compartment in a second dimension that is perpendicular to the transverse dimension.

Additional advantages of the disclosed system and method will be set forth in part in the description which follows, and in part will be understood from the description, or may be learned by practice of the disclosed system and method. The advantages of the disclosed system and method will be realized and attained by means of the elements and combinations particularly pointed out in the appended claims. It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate several embodiments of the disclosed apparatus, system, and method and together with the description, serve to explain the principles of the disclosed apparatus, system, and method.

DETAILED DESCRIPTION

Figure 1:
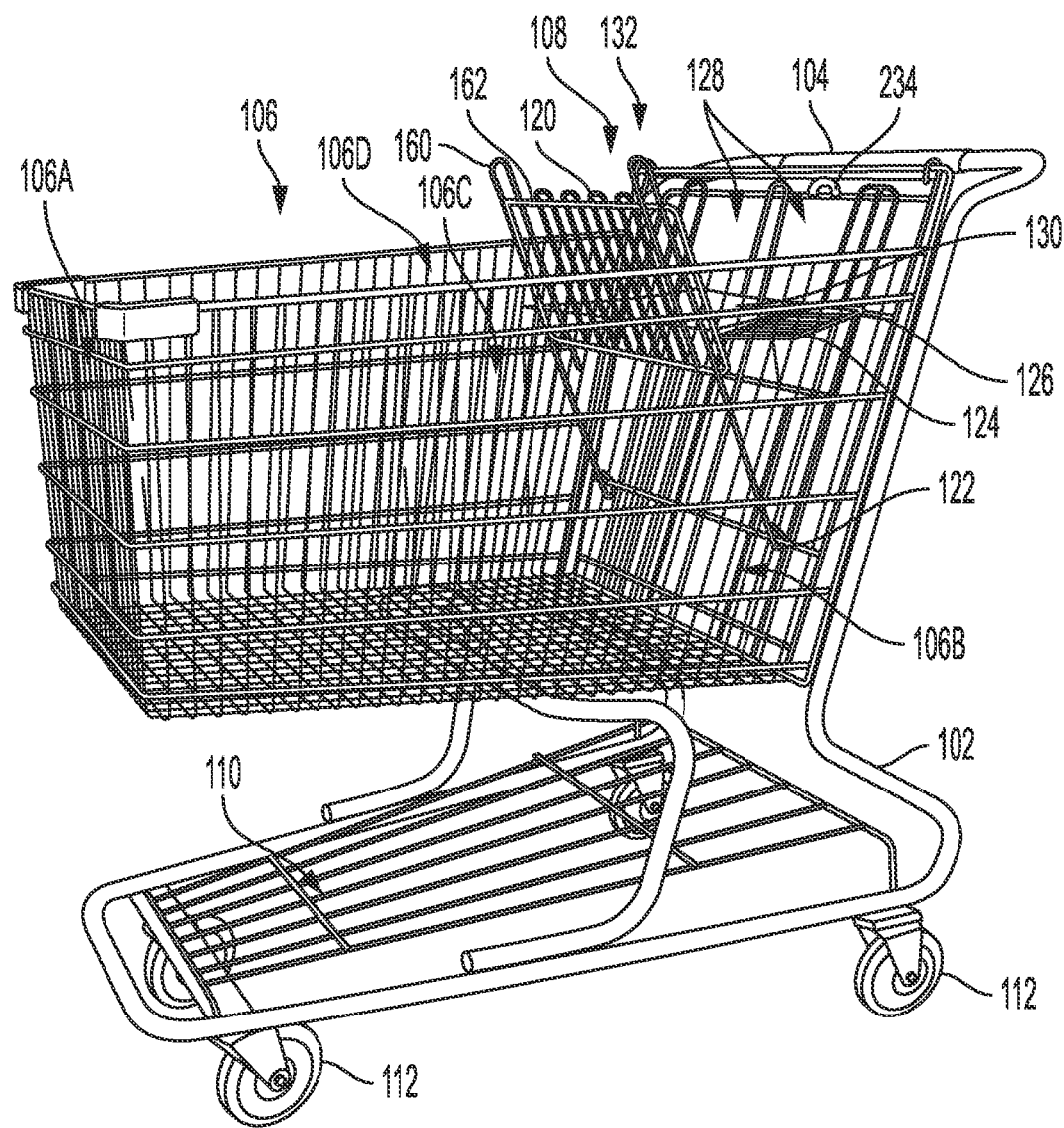
FIG. 1 is a shopping cart as disclosed herein.

The disclosed system and method may be understood more readily by reference to the following detailed description of particular embodiments and the examples included therein and to the Figures and their previous and following description.

A. Definitions

It is to be understood that the terminology used herein is for the purpose of describing particular embodiments only, and is not intended to limit the scope of the present invention which will be limited only by the appended claims.

It must be noted that as used herein and in the appended claims, the singular forms "a", "an", and "the" include plural references unless the context clearly dictates otherwise. Thus, for example, reference to "a wire" includes a plurality of such wires, and reference to "the wire" is a reference to one or more wires and equivalents thereof known to those skilled in the art, and so forth.

"Optional" or "optionally" means that the subsequently described event, circumstance, or material may or may not occur or be present, and that the description includes instances where the event, circumstance, or material occurs or is present and instances where it does not occur or is not present.

Ranges may be expressed herein as from "about" one particular value, and/or to "about" another particular value. When such a range is expressed, also specifically contemplated and considered disclosed is the range from the one particular value and/or to the other particular value unless the context specifically indicates otherwise. Similarly, when values are expressed as approximations, by use of the antecedent "about," it will be understood that the particular value forms another, specifically contemplated embodiment that should be considered disclosed unless the context specifically indicates otherwise. It will be further understood that the endpoints of each of the ranges are significant both in relation to the other endpoint, and independently of the other endpoint unless the context specifically indicates otherwise. Finally, it should be understood that all of the individual values and sub-ranges of values contained within an explicitly disclosed range are also specifically contemplated and should be considered disclosed unless the context specifically indicates otherwise. The foregoing applies regardless of whether in particular cases some or all of these embodiments are explicitly disclosed.

Optionally, in some aspects, when values or characteristics are approximated by use of the antecedents "about," "substantially," or "generally," it is contemplated that values within up to 15%, up to 10%, up to 5%, or up to 1% (above or below) of the particularly stated value or characteristic can be included within the scope of those aspects.

Unless defined otherwise, all technical and scientific terms used herein have the same meanings as commonly understood by one of skill in the art to which the disclosed apparatus, system, and method belong. Although any apparatus, systems, and methods and materials similar or equivalent to those described herein can be used in the practice or testing of the present apparatus, system, and method, the particularly useful methods, devices, systems, and materials are as described.

Throughout the description and claims of this specification, the word "comprise" and variations of the word, such as "comprising" and "comprises," means "including but not limited to," and is not intended to exclude, for example, other additives, components, integers or steps. In particular, in methods stated as comprising one or more steps or operations it is specifically contemplated that each step comprises what is listed (unless that step includes a limiting term such as "consisting of"), meaning that each step is not intended to exclude, for example, other additives, components, integers or steps that are not listed in the step.

B. Lockable Panel for Shopping Cart

Figure 2:
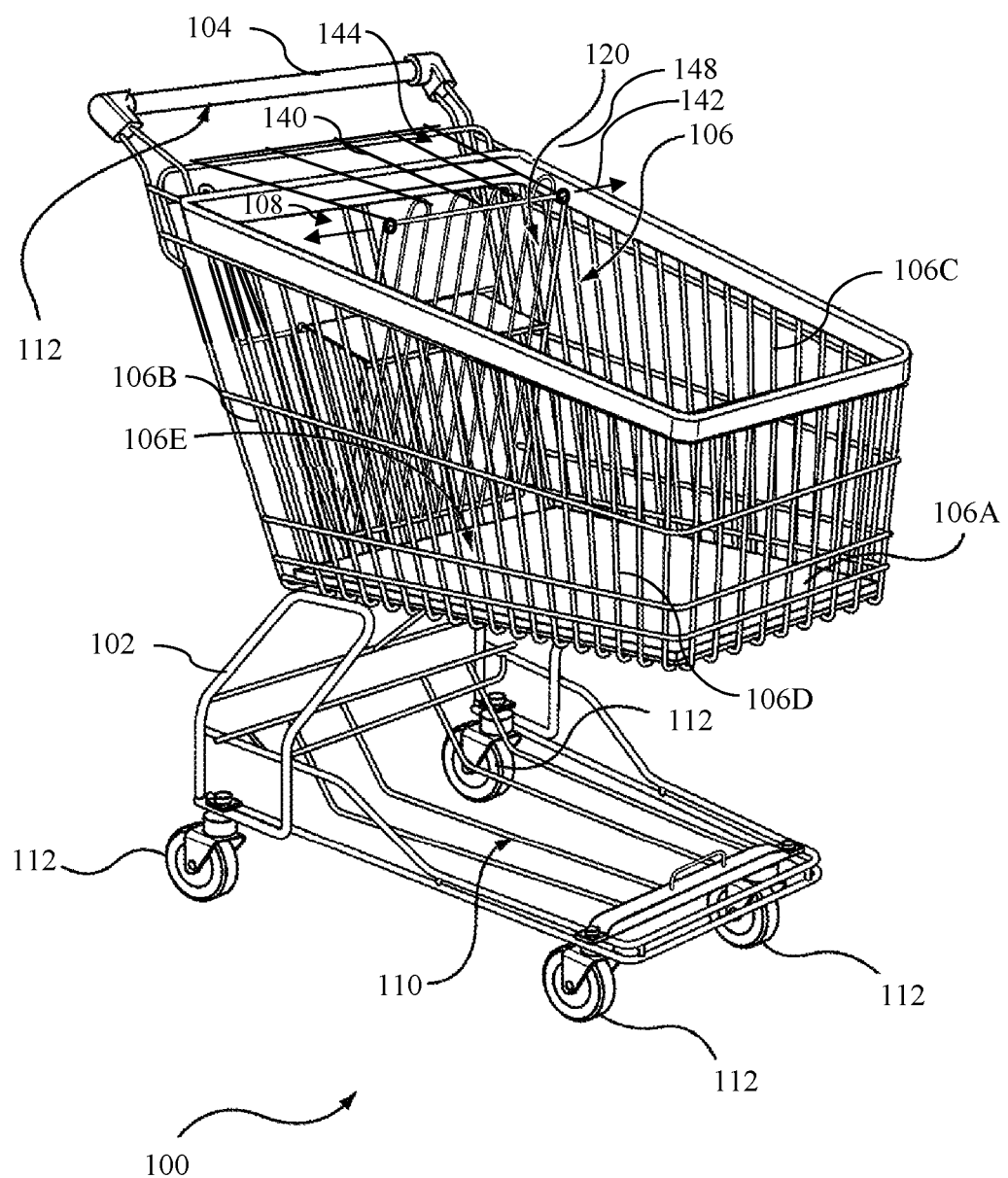
FIG. 2 is a shopping cart comprising a lockable panel in accordance with embodiments disclosed herein.

Disclosed herein is a securable (e.g., lockable or latchable) panel for a shopping cart and a shopping cart comprising the same. Referring to FIGS. 1-2, a shopping cart 100 can comprise a frame 102 that can comprise bent metal tubing. The frame can define a horizontal, transversely extending handle 104. A wire mesh or plastic mesh main compartment 106 can attach to the frame. The main compartment can define a front face 106A, an opposing rear face 106B, first and second side faces 106C, 106D extending between the front wall and the rear face, and a bottom face 106E extending along and between bottom edges of the front face 106A, the rear face 106B, and the first and second side faces 106C, 016D. A plurality of wheels 112 can couple to the bottom of the frame to facilitate mobility of the shopping cart 100. A pair of rear wheels can have a fixed orientation with respect to the frame, and a pair of front wheels can swivel with respect to the frame to facilitate turning of the shopping cart. A wire mesh 110 can define a lower flat carrying surface.

A secondary compartment 108 can be movable between a collapsed configuration and a deployed configuration. The secondary compartment can be disposed within the main compartment 106 and defined at least partially by a portion of the main compartment. The secondary compartment 108 can comprise a first panel 120 that is pivotable about a first axis 126. The first panel 120 can comprise, at a proximal end, wire loops through which transversely extending wires at the back face 106B and, accordingly, the first axis 126 extend. The first panel 120 can be pivoted about the first axis 126 to a position that is proximate, and generally parallel, to the back face 106B when the secondary compartment is in the collapsed configuration. The secondary compartment 108 can further comprise a lower panel 124 that is pivotably coupled via wire loops encircling transversely extending wires of the first panel 120. The secondary compartment 108 can further include transversely extending wire ends that are slidably received into tracks so that the lower panel can be movable between a collapsed position and a deployed position when the secondary compartment 108 moves from a collapsed configuration to a deployed configuration, respectively. Optionally, the pivotal axis of the lower panel and the slidable tracks can be reversed so that the lower panel can be slidable with respect to the first panel 120 and pivotable with respect to the back face. Accordingly, the secondary compartment 108 can be defined by the first panel 120, the lower panel 124, a portion of the back face 106B, and portions of side faces 106C, 106D. The secondary compartment 108 can define a top opening 132.

Optionally, the secondary compartment 108 can include leg holes 128 defined in the back face 106B that can receive legs of a child or toddler. A flippable panel 130 can be pivoted about its pivotal axis 126 that it shares with the lower panel 124 to cover the leg holes 128.

According to another embodiment, the shopping cart 100 can comprise molded plastic components. An embodiment of such a shopping cart is disclosed in U.S. Pat. No. 4,046,394 to Thompson, Jr., which is hereby incorporated by reference herein in its entirety for all purposes.

Figure 3:
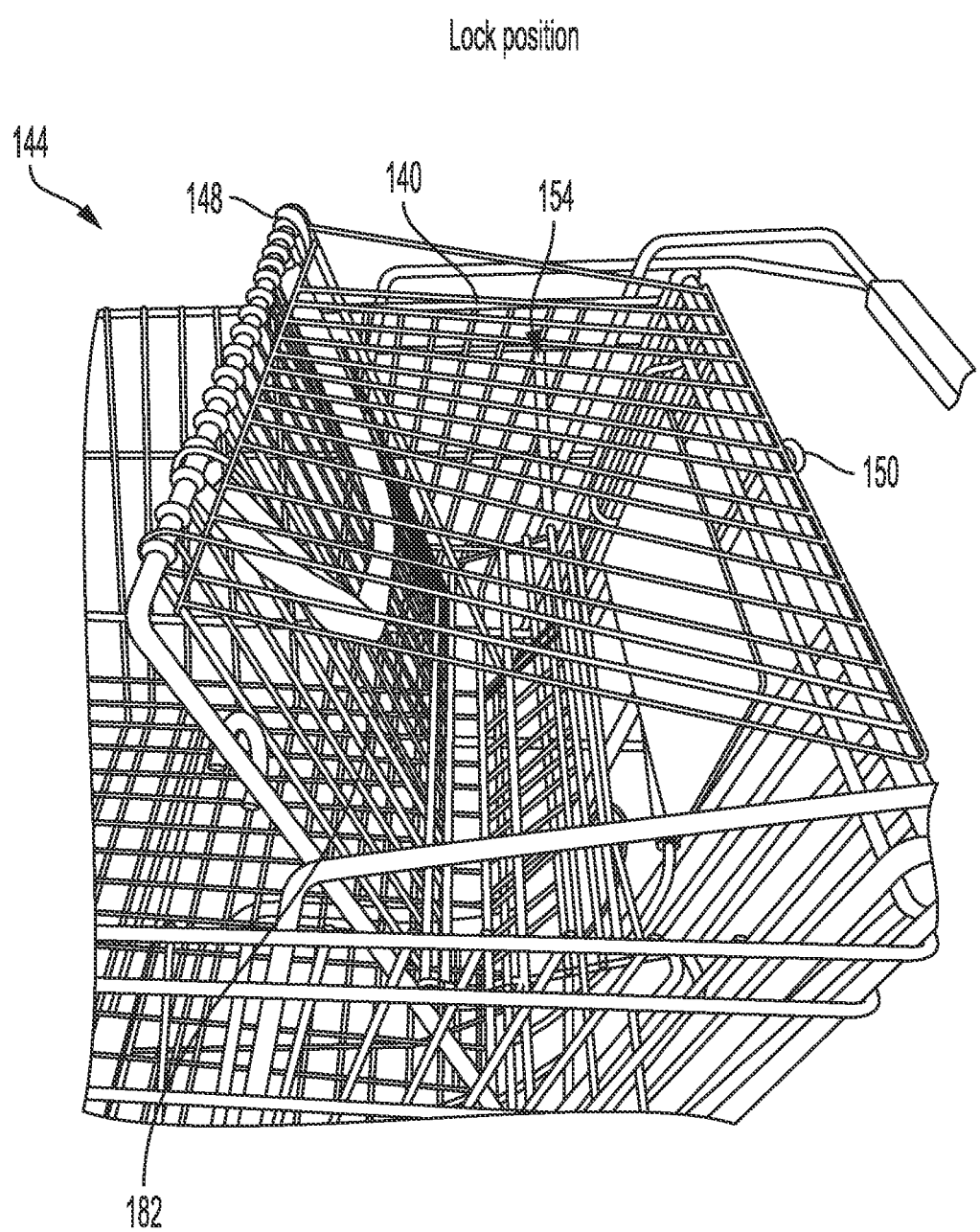
FIG. 3 is a perspective view of the shopping cart and lockable panel as in FIG. 2, with the lockable panel in a first, covering position.
Figure 4:
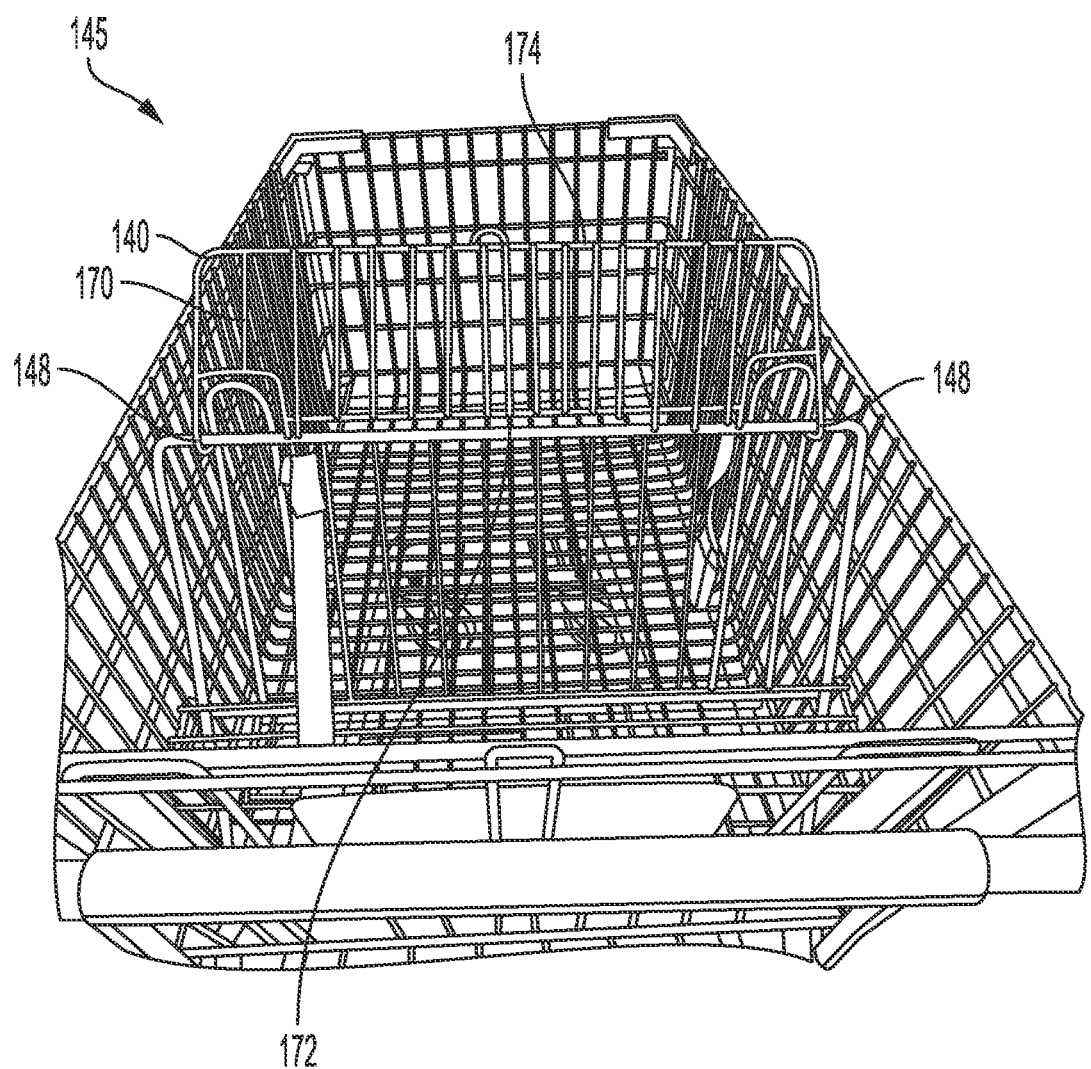
FIG. 4 is a perspective view of the shopping cart and lockable panel as in FIG. 2, with the lockable panel in a second, intermediate position.
Figure 5:
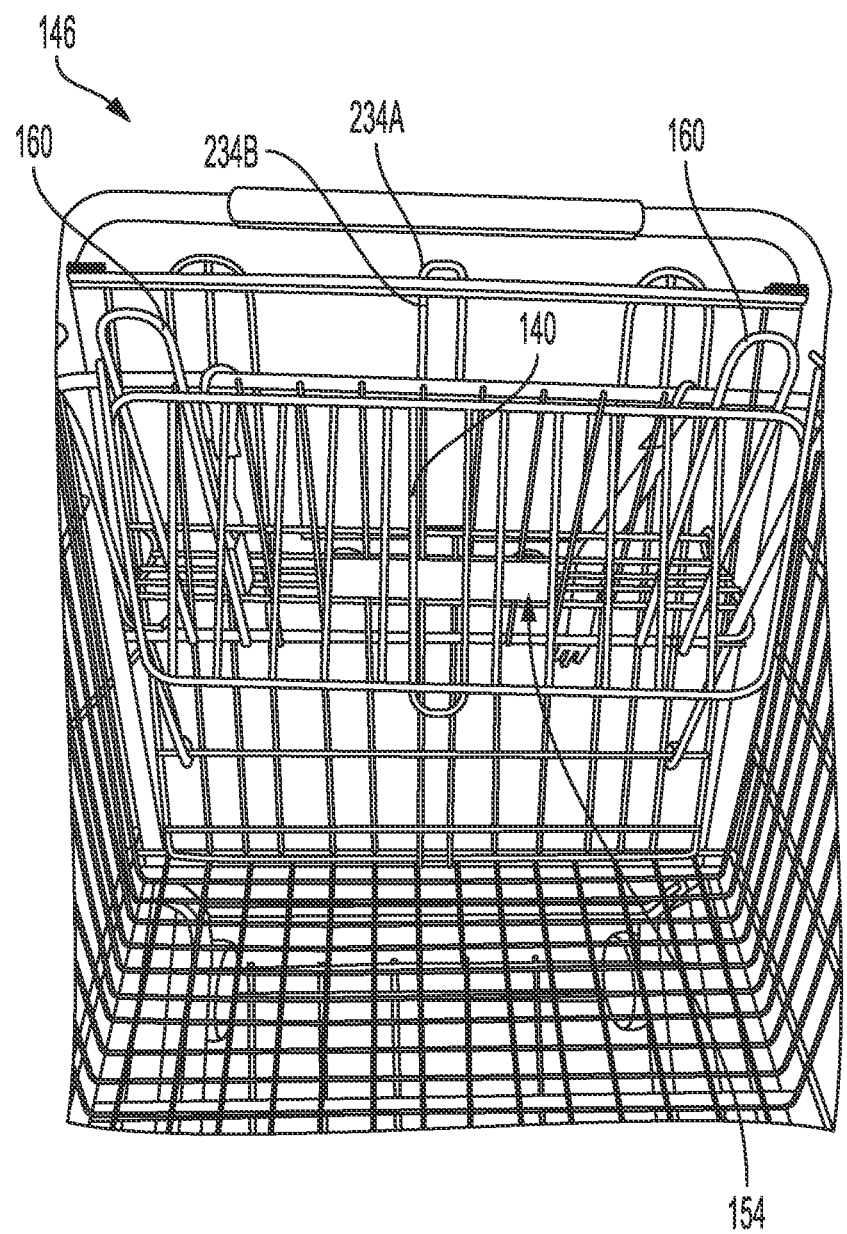
FIG. 5 is a perspective view of the shopping cart and lockable panel as in FIG. 2, with the lockable panel in a third, stowed position.

Referring also to FIGS. 3-5, the shopping cart 100 can further comprise a cover panel 140 that is pivotable about an axis 142 at an upper, distal end of the first panel 120 from a covering orientation 144 (as in FIG. 3) to a stowed orientation 146 (as in FIG. 5) via an intermediate orientation 145 (as in FIG. 4). The cover panel 140 can comprise a plurality of parallel wire segments 170 that extend perpendicularly to the transverse dimension and one or more transversely extending wire segments 172 welded or otherwise bonded to the plurality of parallel wire segments. Although described and depicted as parallel wire segments, it is contemplated that any desired configuration of wire segments can be used, provided it can function as a cover when in the covering orientation as described herein. Proximal ends of at least two of the parallel wire segments can define wire loops 148 that encircle a distal-most transverse wire of the first panel 120. In this way, the pivotal axis 142 of the cover panel 140 can be at or near the distal end of the first panel 120. In some embodiments, the cover panel 140 can comprise a wire frame 174 that extends around a perimeter of the cover panel. The opposing respective ends of the plurality of parallel wire segments can connect at opposite sides of the wire frame 174. Portions of the frame 174 can define the wire loops 148 that encircle the distal-most transverse wire of the first panel 120. Accordingly, the cover can comprise a wire mesh.

In the covering orientation, the cover panel 140 can extend horizontally and generally cover the top opening 132. In some embodiments, a distal transversely extending wire of the cover panel 140 can be proximate to a transversely extending wire of the main compartment so that the pair can be received into a shackle (e.g., a padlock shackle), in order to lock the cover panel in the covering orientation. In further embodiments, the cover panel 140 can comprise a distal loop 150 that receives the shackle in order to lock the cover to the main compartment 106 in the covering orientation 144. That is, the shackle can receive both the distal loop 150 and a portion of the main compartment 106 (or another portion of the shopping cart 100) so that the cover panel 140 cannot be moved from the covering orientation 144. In further embodiments, other locking mechanisms can be implemented. For example, a lockable latch can be integral to the shopping cart. The lockable latch can be locked by a combination that can be set by a user, as is known in the art.

According to another aspect, the cover panel 140 can comprise a plastic mesh surface. According to yet another aspect, the cover panel can comprise a solid surface (i.e., having no holes, in contrast to a mesh). Optionally, the cover panel 140 can define a planar or generally planar surface. The cover panel 140 can be sized to generally cover the top opening 132. For example, the cover panel 140 can have a width in the transverse dimension that is approximately the width of the secondary compartment 108 in the transverse dimension. In further embodiments, the width of the cover panel 140 can be about ten percent less than the width of the secondary compartment 108. In yet further embodiments, the width of the cover panel 140 can be slightly greater than (e.g., within about 5 percent of) the width of the secondary compartment 108. Similarly, the length of the cover panel 140 can be approximately the length of the top opening (i.e., the spacing between the upper edge of the first panel 120 and the upper edge of the back face 106B). In some embodiments, the length of the cover panel 140 can be about ten percent less than the length of the top opening. In further embodiments, the length of the cover panel 140 can be slightly greater than the length of the top opening 132. In some embodiments, when the cover panel 140 is in the covering orientation 144, the second compartment 108 and the cover 140 can cooperate to define a generally enclosed volume. It should be understood that the flippable panel 130 can be pivoted to the orientation in which it covers the leg holes 128, and a purse or other item can be disposed in the second compartment to thereby prop up the flippable panel 130 in the position in which it covers the holes 128 and prevent the flippable panel from being pivoted away from the holes 128. Accordingly, the second compartment 108 and the cover 140 can cooperate to define a compartment having holes therethrough having a cross sectional area of no greater than twenty-five square inches. In further embodiments, the second compartment 108 and the cover 140 can cooperate to define holes therethrough having a cross sectional area of no greater than twenty inches or fifteen square inches. For example, in some aspects, a largest hole 182 (FIG. 3) can be defined by a top edge of the second side face 106C, a side edge of the cover 140, and a top side edge of the first panel 120, and the largest hole can have an area of less than twenty-five square inches, or less than twenty square inches, or less than fifteen square inches.

In the stowed orientation 146, the cover panel 140 can extend generally parallel to the first panel 120 (i.e., less than ten degrees from parallel). A magnet 154 can non-magnetically attach to the cover panel 140 (e.g., via weld) at a position so that when the cover panel 140 is in the covering orientation, the magnet can magnetically engages the first panel 120. In this way, the magnet can hold the cover panel 140 in the stowed orientation 146.

Figure 6:
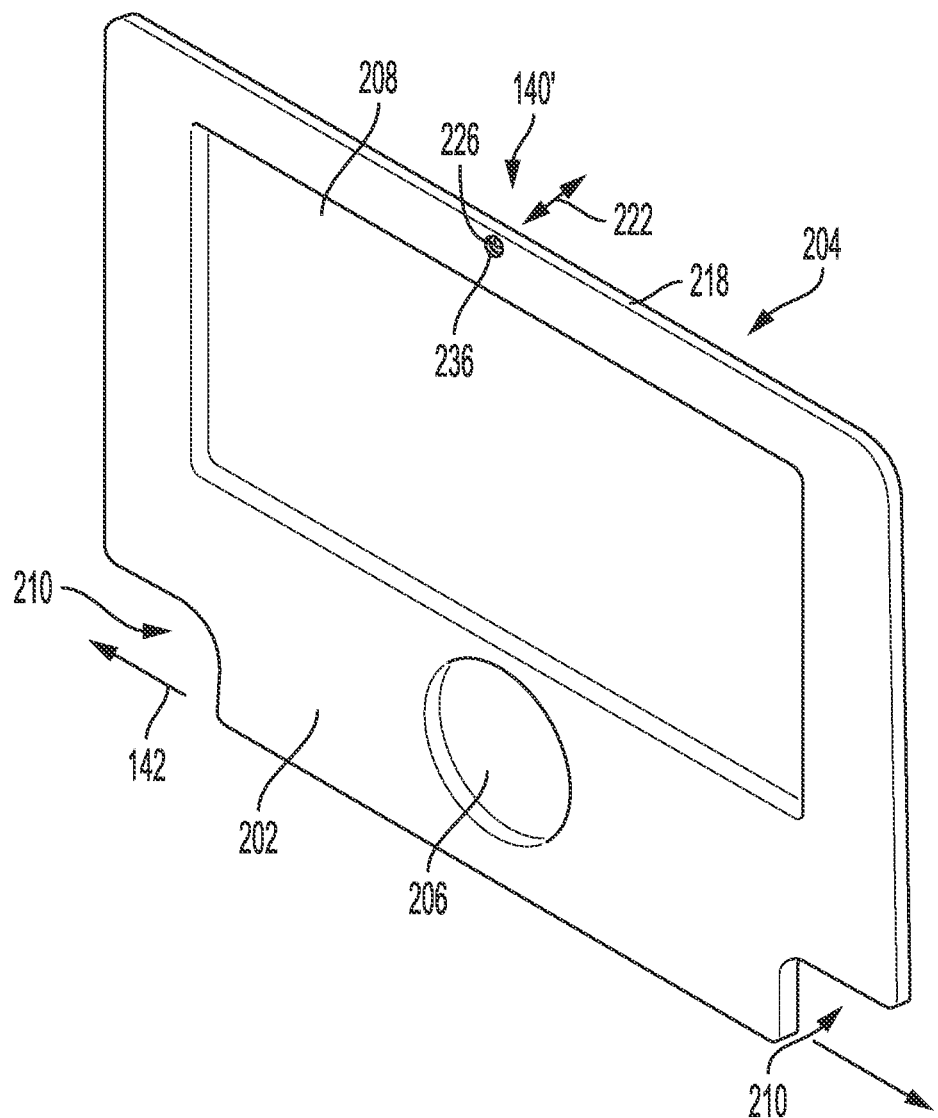
FIG. 6 is a perspective view of a cover panel that can be latched.
Figure 7:
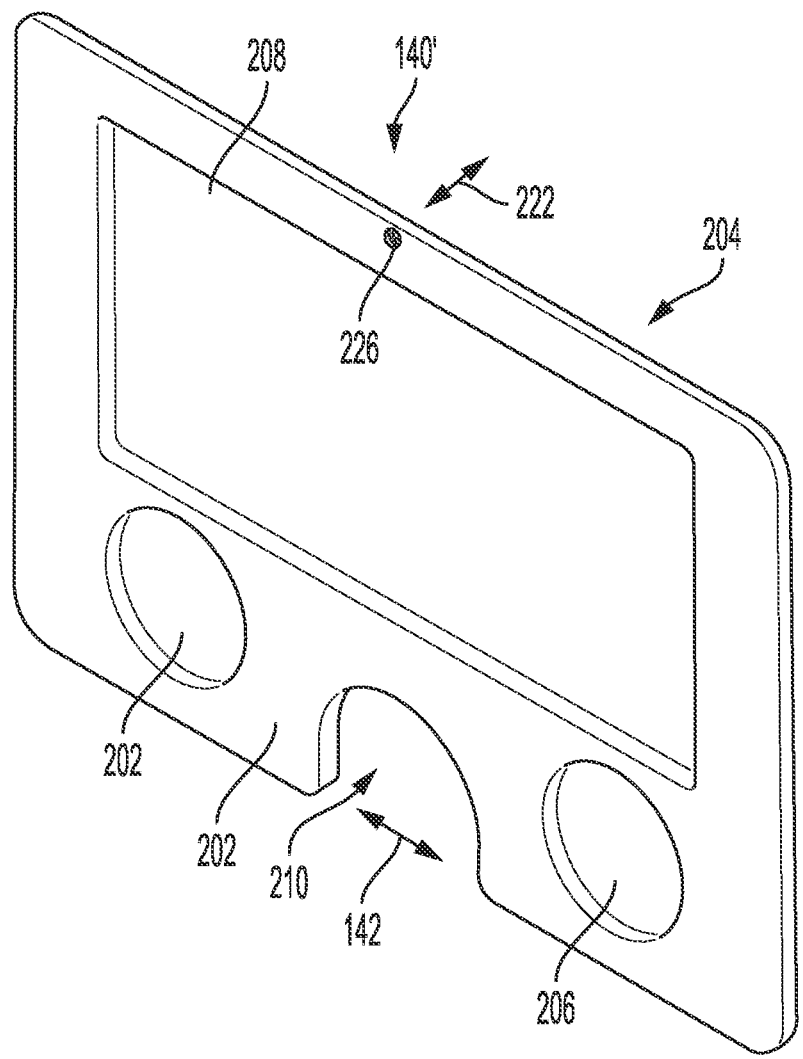
FIG. 7 is a perspective view of another cover panel that can be latched.

Referring to FIGS. 6 and 7, in another embodiment, a cover panel 140' can comprise a continuous sheet (e.g., a sheet that does not include a wire or mesh structure). The cover panel 140' can, comprise, for example, molded polymer (e.g., high impact polystyrene), or sheet metal (e.g., stamped sheet metal). The cover panel can optionally be transparent or opaque.

Figure 9:
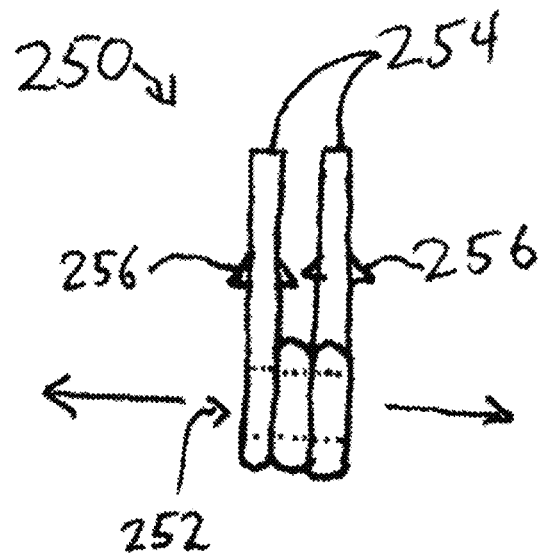
FIG. 9 is a top view of a wire loop for attaching the cover panels of FIGS. 6 and 7 to a shopping cart.

Referring also to FIG. 9, the cover panel 140' further comprise one or more wire loops 250 that are configured to engage the distal-most transverse wire of the first panel 120.

Figure 10A:
FIG. 10A is a side view of a tab for attaching the cover panels of FIGS. 6 and 7 to a shopping cart.
Figure 10B:
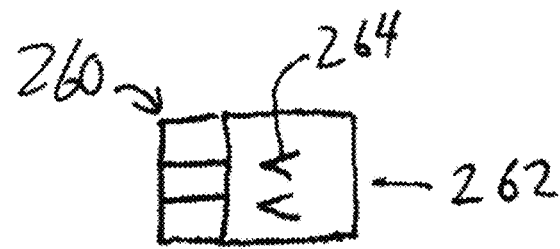
FIG. 10B is a top view of a tab for attaching the cover panels of FIGS. 6 and 7 to the shopping cart.
Figure 10C:
FIG. 10C is a perspective view of a tab for attaching the cover panels of FIGS. 6 and 7 to the shopping cart.

For example, the loops 250 can have a helical path defining a through-hole 252 that can receive the distal-most transverse wire of the first panel 120 therethrough. The wire loops 250 can comprise ends 254 that can be received within respective holes (not shown) in the proximal end of the cover panel 140'. The wire loops 250 can further comprise engagement features (e.g., barbs 256) that can enable insertion into, but inhibit removal from, the holes in the ends of the cover panel 140'. In still further aspects, with reference to FIGS. 10A-10C, metal tabs 260 can be crimped around the distal wire of the first panel 120, and opposing ends 262 can be inserted into the cover panel 140'. Barbs 264 can retain the metal tabs 260 within the cover panel 140'. Other attachment mechanisms, such as, for example, overmolding, can enable coupling between the cover panel 140' and the wire loops 250 or tabs 260. In further aspects, the loops that receive the distal wire of the first panel 120 can be integrally formed with (e.g., molded polymer portions of) the cover panel 140'.

The cover panel can have an upper surface 202 and a lower surface 204. The upper surface 202 of the cover panel 140' can define one or more cylindrical recessions 206 that can be useful, for example, as cup holders. Additionally, or alternatively, the upper surface 202 can define one or more non-cylindrical recession 208 that can be beneficial for holding various items.

The cover panel can have a taper toward the distal end. In this way, the cover panel can have a sufficient thickness to receive the wire loops 250 or tabs 260 as well as structural rigidity at the proximal side while minimizing mass at the distal end that requires less rigidity.

Referring also to FIG. 1, many conventional shopping carts have one or more loops 160 that project beyond the top edge 162 of the first panel 120. For example, FIGS. 1 and 4 show embodiments of shopping carts having two loops 168 on opposing ends of the first panel 120. FIG. 6 illustrates an embodiment of the cover panel 140' having cut-outs 210 that are positioned and sufficiently sized to allow the loops 160 to pass therethrough as the cover panel 140' is pivoted about and between the stowed orientation and the covering orientation. Other conventional carts have a single loop 160 that is positioned centrally along the top edge 162 of the first panel. FIG. 7 illustrates an embodiment having a single cut-out 210 that is positioned and sufficiently sized to allow the centrally positioned loop 160 to pass therethrough.

Figure 8:
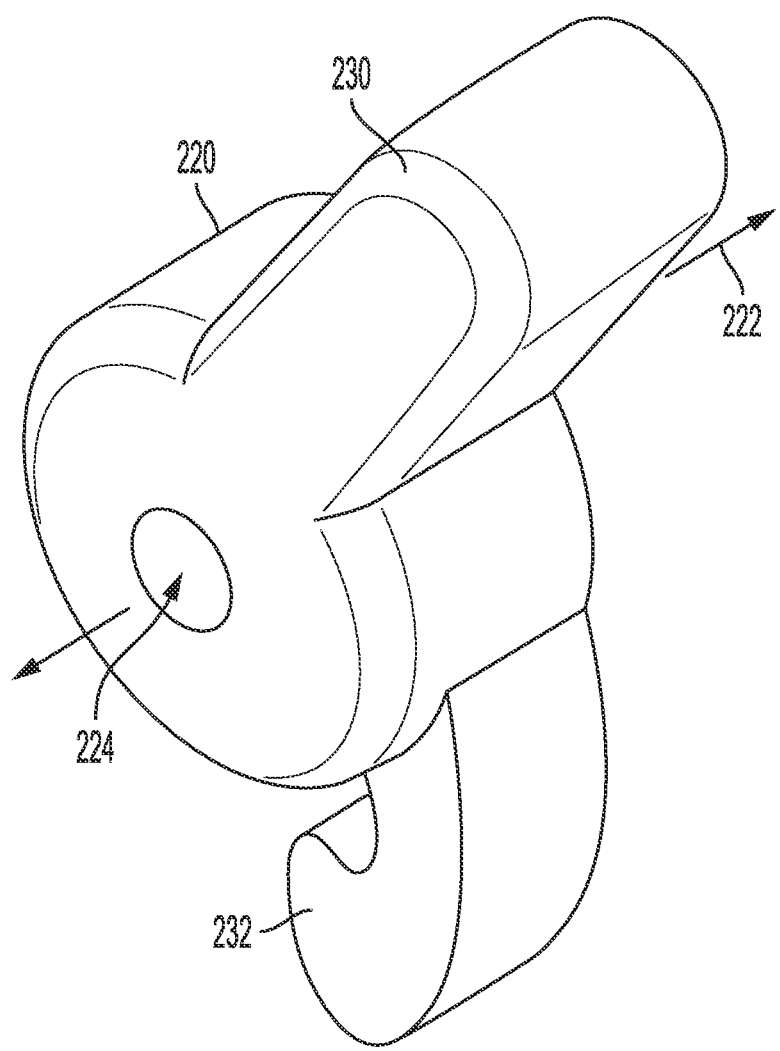
FIG. 8 is a perspective view of a latch that can be used with the cover panels of FIGS. 6 and 7 to latch the cover panel in the covering position.

Referring to FIGS. 6-8, in some aspects, a latch 220 can be pivotably coupled to the cover panel 140' about a pivotal axis 222. For example, the latch 220 can define a through-hole 224, and the cover panel 140' can define a corresponding through-hole 226. The respective through-holes 224,226 can receive a pin, rivet, or other element that can enable pivotable movement between the cover 140' and the latch 220 about the pivotal axis 222.

In some aspects, the latch 220 can comprise a handle 230 that can be actuated, for example, via a user's thumb. The latch 220 can comprise a hook 232 that can be configured to engage a corresponding retainer 234 (FIG. 1) when the cover panel 140' is in the covering orientation. The retainer 234 can be a loop, eye, hook, through-hole, or any suitable structure for receiving the hook 232. When the hook 232 of the latch 220 is received within the retainer 234, the engagement between the latch 220 and the retainer 234 can inhibit the cover panel 140' from being moved from its covering orientation (FIG. 3). Similarly, the latch 220 can be actuated to pivot from its engagement with the retainer 234.

In further optional aspects, the retainer 234 can be a portion of the wire mesh main compartment 106. For example, referring also to FIG. 5, when the cover panel 140' is in the covering position, a first portion 234A of the wire mesh main compartment 106 can be positioned for engagement with the latch 220 to operate as a receptacle. In a further aspect, when the cover panel 140' is in the covering position, a second portion 234A of the wire mesh main compartment 106 can be positioned for engagement with the latch 220 to operate as a receptacle.

In some embodiments, the latch 220 can be positioned below the lower surface 204 of the cover panel 140'. In further aspects, the latch 220 can be positioned above the upper surface 202 of the cover panel 140'. Optionally, the through hole 226 can be positioned proximate to a distal edge 218 of the cover panel 140' so that the hook 232 of the latch 220 can, in some orientations, extend beyond the distal edge 218. Thus, in some optional aspects, when the cover panel 240 is in the covering orientation, the distal edge 218 can be short of the retainer 234, and the hook 232 of the latch 220 can extend from the distal edge 218 to engage the retainer 234.

In some optional aspects, the lower surface 204 and/or the upper surface 202 of the cover panel 140' can comprise a counter bore 236 around the hole 226. The counter bore 236 can receive a washer or a portion of the fastener for coupling the latch 220 to the cover panel 140'.

It should be understood that the cover panel 140' can comprise various other aspects as described with reference to the cover panel 140. For example, the cover panel 140' can comprise one or more magnets that are configured to magnetically engage the first panel 120 and retain the cover panel 140' in the stowed position.

In further optional aspects, it is contemplated that the latch and retainer's respective positions can be reversed so that the latch 220 can be pivotably coupled to the main portion (e.g., the frame 102 or wire mesh 106) of the shopping cart of the shopping cart and the retainer 234 can be coupled to the cover panel 140'. Optionally, the retainer 234 can be coupled to the cover panel 140' via integral formation. That is, a portion of the main portion of the shopping cart can act as the retainer.

Exemplary Aspects

In view of the described products, systems, and methods and variations thereof, herein below are described certain more particularly described aspects of the invention. These particularly recited aspects should not however be interpreted to have any limiting effect on any different claims containing different or more general teachings described herein, or that the "particular" aspects are somehow limited in some way other than the inherent meanings of the language literally used therein.

Aspect 1: A shopping cart comprising: a frame; a plurality of wheels coupled to a bottom of the frame; a main compartment coupled to the frame, the main compartment defining a front face, a back face opposing the front face, first and second side faces extending between respective side edges of the front face and the back face, and a bottom face extending between lower edges of the first and second side faces between the front face and the back face; a secondary compartment that is movable between a collapsed configuration and a deployed configuration and that is disposed at least partially within the main compartment, wherein the secondary compartment comprises: a first panel that is pivotable about a first axis to a position that is proximate to the back face when the secondary compartment is in the collapsed configuration, and a lower panel that is pivotably coupled at a first end and slidably coupled at a second end so that the lower panel is movable between a collapsed position and a deployed position, wherein the first panel, the back face, the lower panel, and portions of the side faces cooperate to define the secondary compartment having a top opening; and a cover panel that is pivotable about a second axis from a first orientation that is generally parallel to and adjacent to the first panel to a second orientation that covers the top opening of the secondary compartment.

Aspect 2: The shopping cart of aspect 1, wherein the cover panel further comprises a loop configured to receive a lock hasp.

Aspect 3: The shopping cart of aspect 1 or aspect 2, wherein the cover panel further comprises a magnet that is configured to engage the first face in order to hold the cover panel in the first orientation.

Aspect 4: The shopping cart of any one of the preceding aspects, wherein the lower panel is pivotably coupled at a first end to the first panel and slidably coupled at a second end at the back face so that the lower panel is movable between a collapsed position and a deployed position.

Aspect 5: The shopping cart of any one of the preceding aspects, wherein the cover panel is generally planar.

Aspect 6: The shopping cart of any one of the preceding aspects, wherein the cover panel comprises a mesh.

Aspect 7: The shopping cart of aspect 6, wherein the mesh is a wire mesh.

Aspect 8: The shopping cart of any one of the preceding aspects, wherein the top opening has a length and a width, and wherein the cover panel extends at least 90% of the width of the top opening in a transverse dimension, and wherein the cover panel extends at least 90% of the length of the top opening in a second dimension that is perpendicular to the transverse dimension.

Aspect 9: The shopping cart of any one of the preceding aspects, wherein the cover panel extends at least the length of the top opening in the second dimension.

Aspect 10: The shopping cart of any one of the preceding aspects, wherein, when the cover panel is in the second orientation, the second compartment and the cover cooperate to define an enclosed volume with a largest opening having an area that is less than twenty-five square inches.

Aspect 11: The shopping cart of any one of the preceding aspects, wherein the cover panel comprises at least one material selected from the group of molded polymer and sheet metal.

Aspect 12: The shopping cart of any one of the preceding aspects, further comprising a latch that is pivotably coupled to one of the main compartment of the shopping cart and the cover panel, and a retainer that is coupled to the other of the main compartment of the shopping cart and the cover panel, wherein, when the cover panel is in the second orientation, the latch is configured to be pivoted from a first position that is engagement with the retainer and a second position that is not in engagement with the retainer, wherein, when the latch is in engagement with the retainer, the latch inhibits movement of the cover panel from the second orientation.

Aspect 13: The shopping cart of aspect 12, wherein the latch is pivotably coupled to the shopping cart, and the retainer is coupled to the main compartment.

Aspect 14: A cover panel for a shopping cart comprising a main compartment and a collapsible secondary compartment defining a top opening having a length and a width and comprising a first panel that is pivotable from a stowed position that is generally parallel to a back face of the main compartment and a deployed position that is pivoted from the stowed position, wherein the first panel comprises a top edge, the cover panel comprising: a generally planar cover panel that is configured to pivotably couple with the first panel at a top edge of the first panel, wherein the generally planar cover panel extends at least a majority of the width of the secondary compartment in a transverse dimension, and wherein the generally planar cover extends at least a majority of the length of the secondary compartment in a second dimension that is perpendicular to the transverse dimension.

Aspect 15: The cover panel of aspect 14, wherein the cover panel further comprises a loop configured to receive a lock hasp.

Aspect 16: The cover panel of aspect 14 or aspect 15, wherein the cover panel further comprises a magnet that is configured to engage the first face in order to hold the cover panel in the first orientation.

Aspect 17: The cover panel of any one of aspects 14-16, wherein the cover panel comprises at least one of a mesh, sheet metal, or molded polymer.

Aspect 18: The cover panel of any one of aspects 14-17, wherein the cover panel is sized to extend at least 90% of the width of the top opening in a transverse dimension, and wherein the cover panel is sized to extend at least 90% of the length of the top opening in a second dimension that is perpendicular to the transverse dimension.

Aspect 19: The cover panel of any one of aspects 14-18, wherein the cover panel is sized to extend at least the length of the top opening in the second dimension.

Aspect 20: The cover panel of any one of aspects 14-19, wherein, when the cover is coupled to the shopping cart and in the second orientation, the cover is configured to cooperate with the second compartment to define an enclosed volume with a largest opening having an area that is less than twenty-five square inches.

Aspect 20: The cover panel of any one of aspects 14-20, wherein the cover panel has a main body portion, the cover panel further comprising a latch that is pivotably coupled to the main body portion about a pivotal axis.

Those skilled in the art will recognize, or be able to ascertain using no more than routine experimentation, many equivalents to the specific embodiments of the method and compositions described herein. Such equivalents are intended to be encompassed by the following claims.

What is claimed is:

1. A shopping cart comprising:
    a frame;
    a plurality of wheels coupled to a bottom of the frame;
    a main compartment coupled to the frame, the main compartment defining a front face, a back face opposing the front face, first and second side faces extending between respective side edges of the front face and the back face, and a bottom face extending between lower edges of the first and second side faces between the front face and the back face;
    a secondary compartment that is movable between a collapsed configuration and a deployed configuration and that is disposed at least partially within the main compartment, wherein the secondary compartment comprises:
        a first panel that is pivotable about a first axis to a position that is proximate to the back face when the secondary compartment is in the collapsed configuration, and
        a lower panel that is pivotably coupled at a first end and slidably coupled at a second end so that the lower panel is movable between a collapsed position and a deployed position,
        wherein the first panel, the back face, the lower panel, and portions of the side faces cooperate to define the secondary compartment having a top opening;

a cover panel that is pivotable about a second axis from a first orientation that is generally parallel to and adjacent to the first panel to a second orientation that covers the top opening of the secondary compartment, wherein the cover panel has an upper surface; and a latch that is pivotally coupled to the cover panel about a pivotal axis that is perpendicular to the upper surface of the cover panel, wherein, when the cover panel is in the second orientation, the latch is configured to be pivoted from a first position that is in engagement with a retainer and a second position that is not in engagement with the retainer, wherein, when the latch is in engagement with the retainer, the latch inhibits movement of the cover panel from the second orientation.

2. The shopping cart of claim 1, wherein the cover panel further comprises a loop configured to receive a lock hasp.

3. The shopping cart of claim 1, wherein the cover panel further comprises a magnet that is configured to engage the first face in order to hold the cover panel in the first orientation.

4. The shopping cart of claim 1, wherein the lower panel is pivotably coupled at a first end to the first panel and slidably coupled at a second end at the back face so that the lower panel is movable between a collapsed position and a deployed position.

5. The shopping cart of claim 1, wherein the cover panel is generally planar.

6. The shopping cart of claim 1, wherein the cover panel comprises a mesh.

7. The shopping cart of claim 1, wherein the top opening has a length and a width, and wherein the cover panel extends at least 90% of the width of the top opening in a transverse dimension, and wherein the cover panel extends at least 90% of the length of the top opening in a second dimension that is perpendicular to the transverse dimension.

8. The shopping cart of claim 7, wherein the cover panel extends at least the length of the top opening in the second dimension.

9. The shopping cart of claim 1, wherein, when the cover panel is in the second orientation, the second compartment and the cover cooperate to define an enclosed volume with a largest opening having an area that is less than twenty-five square inches.

10. The shopping cart of claim 1, wherein the cover panel comprises at least one material selected from the group of molded polymer and sheet metal.

11. The shopping cart of claim 1, wherein the cover panel comprises a main body portion and a hinge element that is non-integral to the main body portion and is partially received within the main body portion, wherein the hinge element comprises at least one barb that inhibits removal of the hinge element from the main body portion.

12. The shopping cart of claim 1, wherein the latch comprises a hook, wherein the cover comprises a distal edge, wherein the hook is configured to extend beyond the distal edge of the cover in at least one orientation of the latch.

13. The shopping cart of claim 1, wherein the main compartment is a wire mesh main compartment, wherein the retainer is a portion of the main compartment.

14. A cover panel for a shopping cart comprising a main compartment and a collapsible secondary compartment defining a top opening having a length and a width and comprising a first panel that is pivotable from a stowed position that is generally parallel to a back face of the main compartment and a deployed position that is pivoted from the stowed position, wherein the first panel comprises a top edge, the cover panel comprising:

a generally planar cover panel that is configured to pivotably couple with the first panel at a top edge of the first panel, wherein the cover panel has an upper surface, wherein the generally planar cover panel extends at least a majority of the width of the secondary compartment in a transverse dimension, and wherein the generally planar cover extends at least a majority of the length of the secondary compartment in a second dimension that is perpendicular to the transverse dimension; and a latch that is pivotally coupled to the cover panel about a pivotal axis that is perpendicular to the upper surface of the cover panel, wherein, the latch is configured to be pivoted from a first position that is in engagement with a retainer and a second position that is not in engagement with the retainer, wherein, when the latch is in engagement with the retainer, the latch inhibits movement of the cover panel from the deployed position.

15. The cover panel of claim 14, wherein the cover panel further comprises a loop configured to receive a lock hasp.

16. The cover panel of claim 14, wherein the cover panel further comprises a magnet that is configured to engage the first face in order to hold the cover panel in the first orientation.

17. The cover panel of claim 14, wherein the cover panel comprises at least one of a mesh, sheet metal, or molded polymer.

18. The cover panel of claim 14, wherein the cover panel is sized to extend at least 90% of the width of the top opening in a transverse dimension, and wherein the cover panel is sized to extend at least 90% of the length of the top opening in a second dimension that is perpendicular to the transverse dimension.

19. The cover panel of claim 18, wherein the cover panel is sized to extend at least the length of the top opening in the second dimension.

20. The cover panel of claim 14, wherein the cover panel comprises a main body portion and a hinge element that is non-integral to the main body portion and is partially received within the main body portion, wherein the hinge element comprises at least one barb that inhibits removal of the hinge element from the main body portion.

* * * * *